(12) United States Patent
Brauneis, Jr. et al.

(10) Patent No.: US 7,797,569 B2
(45) Date of Patent: *Sep. 14, 2010

(54) MECHANISM FOR IMPROVING ACCESSIBILITY OF JMX MONITORING INFORMATION IN WEB CONTENT

(75) Inventors: David Neal Brauneis, Jr., Raleigh, NC (US); Brent Hames Daniel, Morrisville, NC (US); Michael Peter Etgen, Cary, NC (US); Christopher Creighton Mitchell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/021,011

(22) Filed: Jan. 28, 2008

(65) Prior Publication Data

US 2008/0140832 A1    Jun. 12, 2008

Related U.S. Application Data

(63) Continuation of application No. 10/881,596, filed on Jun. 30, 2004, now Pat. No. 7,337,349.

(51) Int. Cl.
*G06F 11/00* (2006.01)
(52) U.S. Cl. .................. 714/4; 714/47; 714/48; 714/57
(58) Field of Classification Search .................. None
See application file for complete search history.

(56) References Cited

U.S. PATENT DOCUMENTS

| 5,778,355 A | 7/1998 | Boyer et al. |
| 5,963,946 A | 10/1999 | Yanagimoto |
| 6,414,695 B1 | 7/2002 | Schwerdtfeger et al. |
| 2002/0091753 A1* | 7/2002 | Reddy et al. ................. 709/202 |
| 2003/0163439 A1 | 8/2003 | Hankin et al. |
| 2003/0208505 A1 | 11/2003 | Mullins et al. |
| 2003/0221002 A1* | 11/2003 | Srivastava et al. ........... 709/224 |

OTHER PUBLICATIONS

Castro, "HTML 2 for the World Wide Web: Visual Quickstart Guide", Safari Books Online, Oct. 20 1999, pp. 1-10.
Kreger, "Java Management Extensions for Application Management", IBM Systems Journal, 2001, pp. 104-129, vol. 40 No. 1.

* cited by examiner

*Primary Examiner*—Yolanda L Wilson
(74) *Attorney, Agent, or Firm*—Jeanine S. Ray-Yarlette, Esq.; Steven M. Greenberg, Esq.; Carey, Rodriguez, Greenberg & Paul, LLP

(57) ABSTRACT

System, method and computer program product for monitoring the status of components in a data processing system that improves the accessibility of JMX monitoring information in web content. The system includes a mechanism for acquiring a text representation of component status for display as ALT and TITLE content associated with each status image. Because the component status is displayed in a manner that is indistinguishable from ALT/TITLE text that has already been statically included in an image attribute, user experience is improved for users with and without accessibility needs.

2 Claims, 6 Drawing Sheets

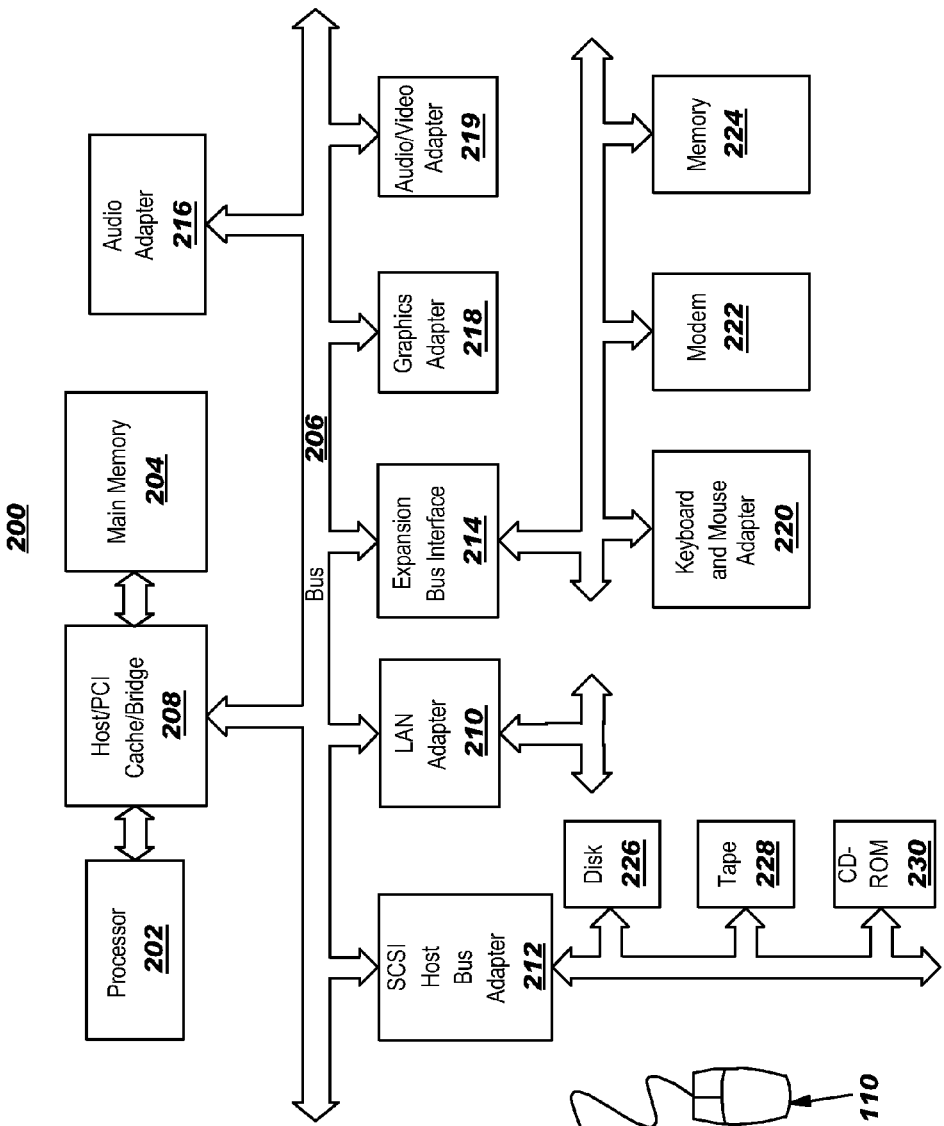
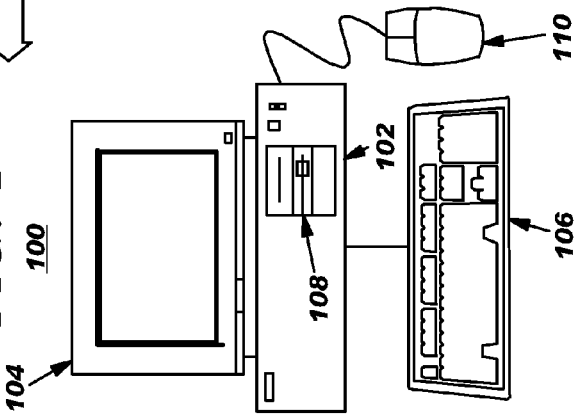

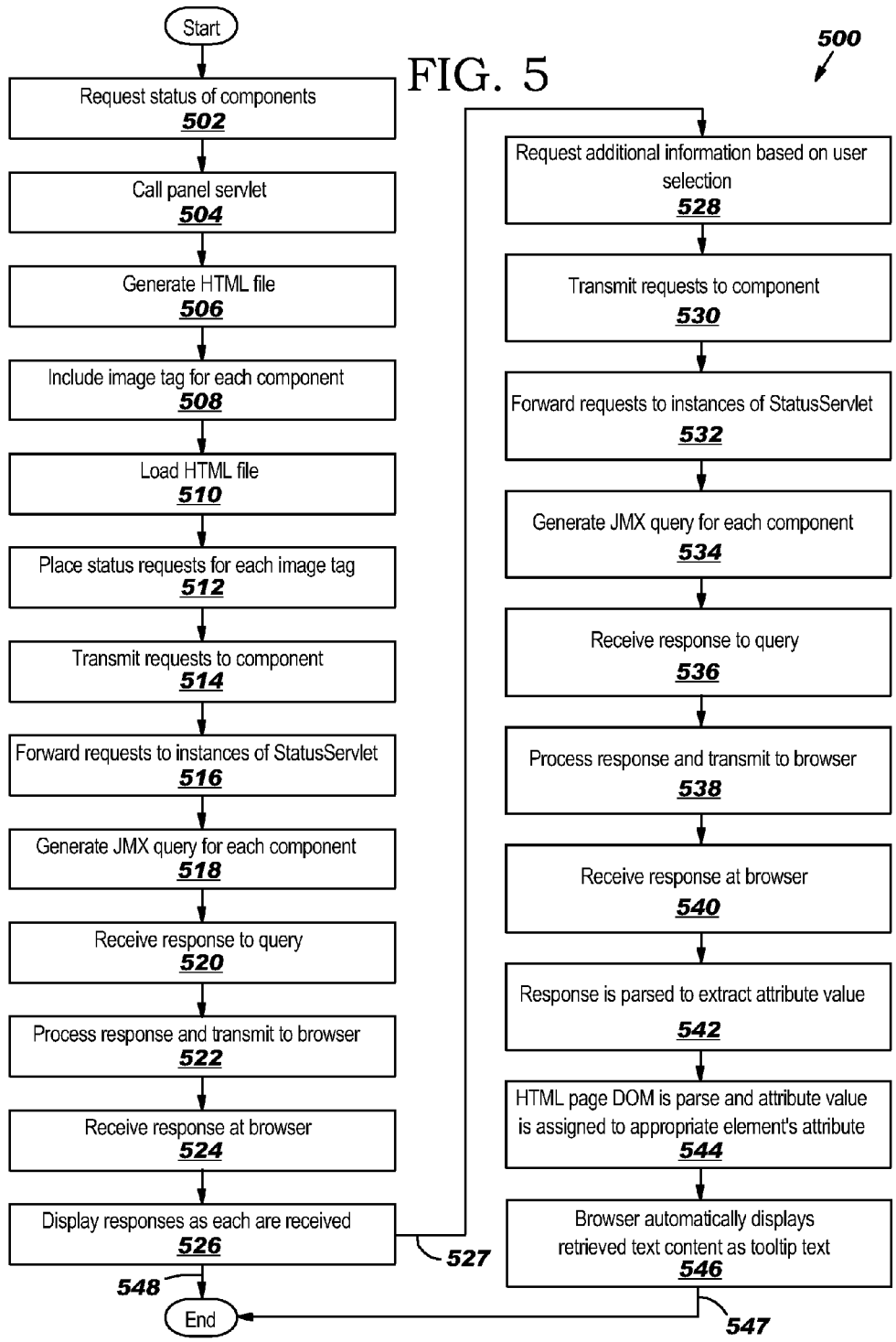

MECHANISM FOR IMPROVING
ACCESSIBILITY OF JMX MONITORING
INFORMATION IN WEB CONTENT

This application is a continuation of application Ser. No. 10/881,596, filed Jun. 30, 2004, now U.S. Pat. No. 7,337,349.

BACKGROUND OF THE INVENTION

1. Technical Field

The present invention relates generally to the data processing field and, more particularly, to a method, system and computer program product for monitoring the status of components in a data processing system.

2. Description of Related Art

Java Management Extensions (JMX) application programming interface (API) provides a mechanism for monitoring the status of components, for example, servers, applications, processes and other resources, in a data processing system such as a Java Enterprise Edition (J2EE) server. The status monitoring API requires a user to perform complex queries in order to obtain the status of components and consequently, it is advantageous to provide a simple client which allows a user to visualize the status of large groups of components. Such a client may conveniently comprise a web page containing a series of images corresponding to the states of the various components being monitored.

JMX queries are executed asynchronously and may not be completed within any specific period of time. The content of a web page, however, typically loads and displays serially. Accordingly, a JMX query may not begin until a previous query has been completed. As a result, although many queries may require only a short period of time to complete, other queries may need more time; and one long-running query can block the completion and display of other, shorter queries.

In a known technique for monitoring the status of a plurality of components in a data processing system, a user at a client device, such as a web-based administrative console, initiates JMX queries to determine the status of the components. The queries are first transmitted to a servlet which processes a first query to determine the status of a first component. The first component responds, and the servlet then processes a second query to determine the status of a second component. Only when responses have been received from all of the plurality of components does the servlet provide the responses to a browser running in the client device.

Often, a user is interested in only a subset of the components for which the status is presented, or is interested in information other than or in addition to the status of the components, for example, a simple list of application servers. Because a JMX query can require as much as three minutes to complete, and because the servlet does not provide the responses to any status queries until responses are received from all components, the user may have to wait a substantial period of time to see the responses even though the specific information desired by the user may be available almost immediately.

A copending application entitled "TOOL FOR DISPLAYING JMX MONITORING INFORMATION", Ser. No. 10/721,819, filed on Nov. 24, 2003, assigned to the same assignee as the present application, and incorporated herein by reference, describes a mechanism that allows the status of data processing system components obtained through JMX queries to be loaded asynchronously in web content such that the status value of each component is displayed as soon as the value becomes available, without having to wait for the completion of any other query. The mechanism uses JMX and specialized images to acquire status information for a large number of components. An image's source attribute is set as a servlet, and the servlet uses JMX to acquire the status of a component, and streams data (corresponding to the appropriate image) back to the browser.

From an accessibility perspective, a problem arises in that the mechanism used by accessible technologies to determine the "value" of an image (i.e., the ALT or TITLE attribute on the image) is not available to the user when the image is streamed back to the browser. This limitation can be overcome by including static content on those attributes that basically say "click" on this image to request text describing the component status. Such a procedure for accessing additional information regarding the status of a component, however, requires opening a new window within which the text for the status is displayed, and is not an optimal solution to the problem.

For non-accessible needs users, such as visually impaired users, dynamic HTML can be used to show a "legend" table that maps images to text for the status. Such an approach, however, is also not fully satisfactory.

It would, accordingly, be advantageous to provide a mechanism for monitoring the status of components in a data processing system that improves the accessibility of JMX monitoring information in web content.

SUMMARY OF THE INVENTION

The present invention provides a system, method and computer program product for monitoring the status of components in a data processing system that improves the accessibility of JMX monitoring information in web content. The system includes a mechanism for acquiring a text representation of a status of a component for display as ALT and TITLE content associated with an image of the status of the component. Because the status text of the component is displayed in a manner that is indistinguishable from ALT/TITLE text that has already been statically included in an image attribute, user experience is improved for both users with and without accessibility needs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented;

FIG. 2 is a block diagram of a data processing system in which the present invention may be implemented;

FIG. 5 is a flowchart that illustrates a method for monitoring the status of components in a data processing system in accordance with a preferred embodiment of the present invention.

DETAILED DESCRIPTION OF THE PREFERRED EMBODIMENT

Figure 3:
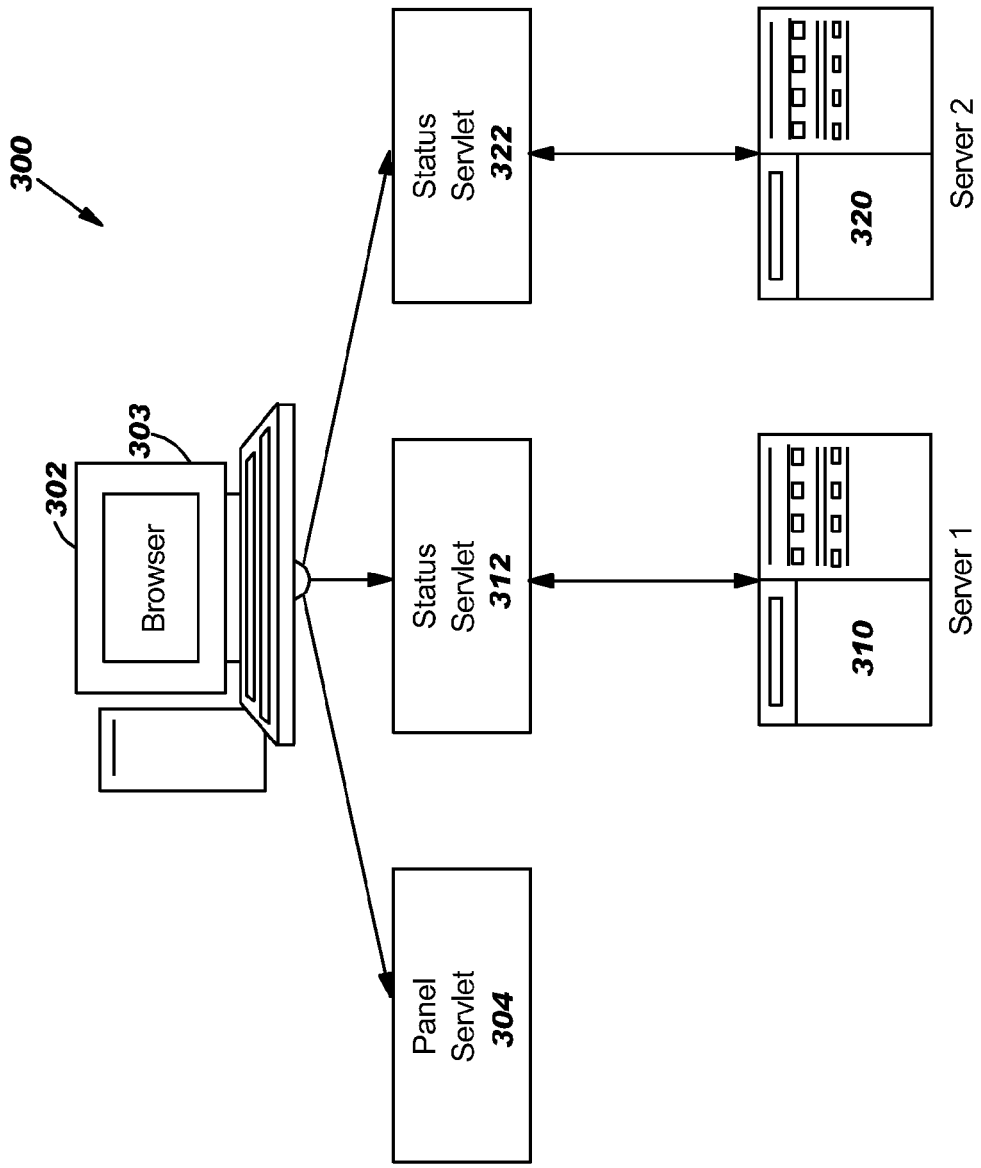
FIG. 3 is a block diagram that illustrates a system for monitoring the status of components in a data processing system in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

FIG. 3 is a block diagram of a system for monitoring the status of components in a data processing system in accordance with a preferred embodiment of the present invention. The system is generally designated by reference number 300 and includes a web-based administrative console 302 running a web browser 303. System 300 also includes two servers 310 and 320, the status of which is to be monitored. Although two servers are illustrated in FIG. 3, it should be understood that system 300 can monitor additional servers and any desired number of other components in a data processing system, including applications, processes and other resources, without departing from the scope of the present invention.

A user at console 302 may request a web page containing the status of components, such as servers 310 and 320. The status may include whether the component is stopped, started, in error, etc. As will be described in greater detail hereinafter, the user may also request other information pertaining to components 310 and 320. A panel servlet 304 dynamically generates an HTML file which ultimately will be used to display the status information on console 302. Servlet 304 includes an image tag which points to a status servlet associated with each component to be monitored, such as status servlets 312 and 322 associated with servers 310 and 320, respectively. The image tags include enough information to perform a JMX query of their corresponding component.

Figure 4A:
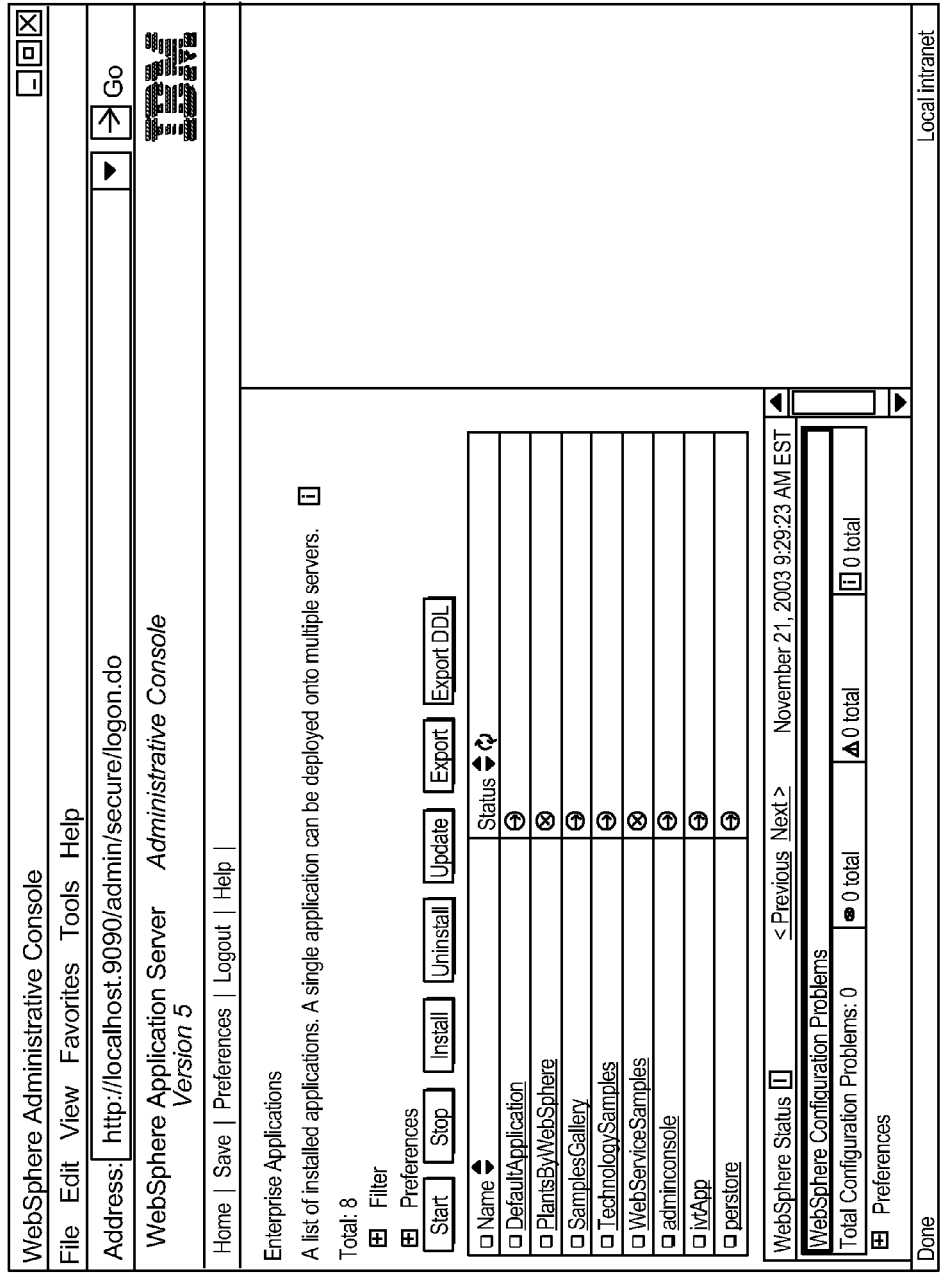
FIG. 4A illustrates an exemplary screen shot of a display of component status information obtained in accordance with a preferred embodiment of the present invention.

In general, requests for component status initiated by a user are transmitted to each server 310 and 320, and are processed by status servlets 312 and 322, respectively. The status servlets generate a JMX query on the corresponding server; and, after receiving a response, processes the response and transmits the response to browser 303. The processed response includes an image corresponding to the value returned from the JMX query and appears as a standard displayable image. FIG. 4A illustrates an exemplary screen shot of a display of component status information obtained for several resources in accordance with a preferred embodiment of the present invention.

FIG. 5 is a flowchart that illustrates a method for monitoring the status of components in a data processing system in accordance with a preferred embodiment of the present invention. The method is generally designated by reference number 500, and begins by a user requesting a web page containing the status of any number of components in a data processing system (step 502). The status may include whether the component is stopped, started, in error, etc. Pursuant to the status request, a panel servlet is called (step 504) to dynamically generate an HTML file (step 506) that will be used to display the requested status information. The panel servlet includes an image tag for each component to be monitored (step 508) which points to a status servlet for each component. Each image tag includes enough information to perform a JMX query of the corresponding component. For example, an exemplary image tag for monitoring the status of a server, such as server 310 or 320 in FIG. 3, might comprise:

<image src="/servlet/StatusServlet?component=Server&name=MyServer"/> which calls a servlet named "StatusServlet" and returns an image representing the status of a component of type "Server" with the name "MyServer".

The web page defined by the HTML file is loaded by a browser running in a user console (step 510) and places status requests for each of the image tags (step 512). These requests are placed in parallel. The requests are transmitted to each component to be monitored (step 514) but are processed by copies or instances of a status servlet, "StatusServlet" in the above example (step 516). Each instance of the status servlet uses the information provided in the request and generates a JMX query on the corresponding component (step 518).

After receiving a response to a query in the form of a value representing the status of a component (step 520), each servlet processes the response and transmits it to the browser (step 522). The processed response includes an image corresponding to the value returned from the JMZ query. The processed response also preferably includes a directive to prevent the browser from caching the response.

The browser receives the response (step 524) which appears as a standard displayable image. As each response is received by the browser it is displayed for the user (step 526), for example, as illustrated in FIG. 4A, even if other queries are still being processed.

Figure 4B:
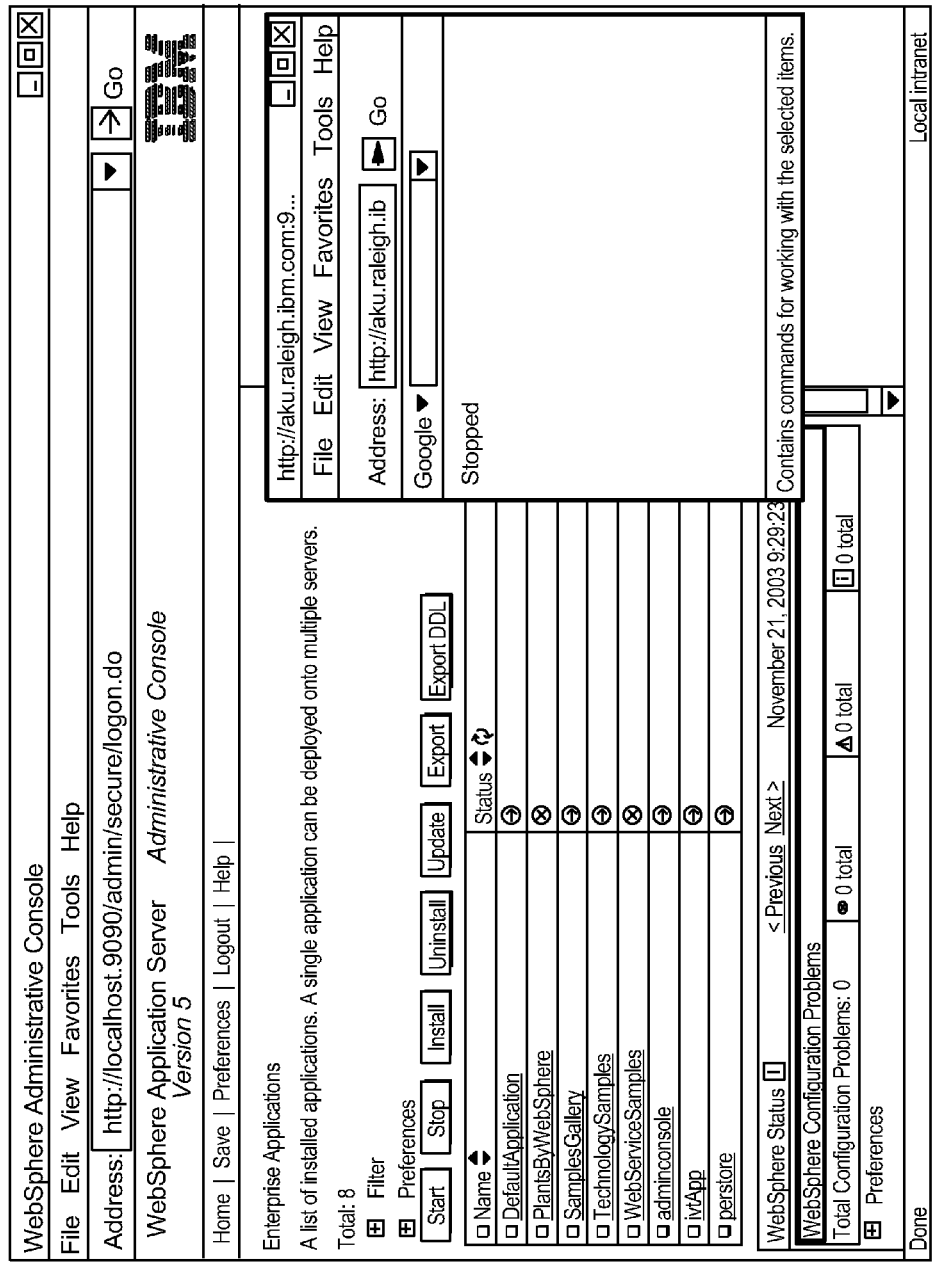
FIG. 4B illustrates the exemplary screen shot of FIG. 4A having status text displayed in a new window to assist in explaining a preferred embodiment of the present invention.

Steps 502-526 of method 500 are described in the previously-mentioned copending application, and enable the status of data processing system components obtained through JMX queries to be loaded asynchronously in web content such that the status value of each component is displayed to a user as soon as the values become available. If the user does not desire additional information regarding the status of any of the components for which the status value is displayed, the method ends as indicated by arrow 548. If, however, the user is interested in obtaining text concerning a component, for example, additional information about the status of a component, this can be accomplished, as described above, by either including static content that says "click" on the status image to request text describing the object status in a new window, as illustrated in FIG. 4B, which illustrates the exemplary screen shot of FIG. 4A having status text displayed in a new window; or the user can use dynamic HTML to show a "legend" table that maps the image to text status. These procedures, however, are not fully satisfactory.

In accordance with a preferred embodiment of the present invention, a mechanism is provided for acquiring a text representation of component status that does not require a legend and does not require a user to go to a separate page to find and mentally map an image to the text description of the status.

The additional information concerning the status of a component can be acquired according to a preferred embodiment of the present invention by a user requesting the additional information after a response concerning the status of the component has been displayed for the user in step 526. In particular, as indicated by arrow 527 in FIG. 5, method 500 continues by the user requesting additional information concerning the status of a component (step 528). The user can make the request, for example, by moving a mouse over or by tabbing to a displayed status image for which more information is desired, for example, one of the status images illustrated in FIG. 4A. The request for additional information is transmitted to the component (step 530), but is processed by copies or instances of the second servlet, "StatusServlet" in the above example (step 532).

Figure 4C:
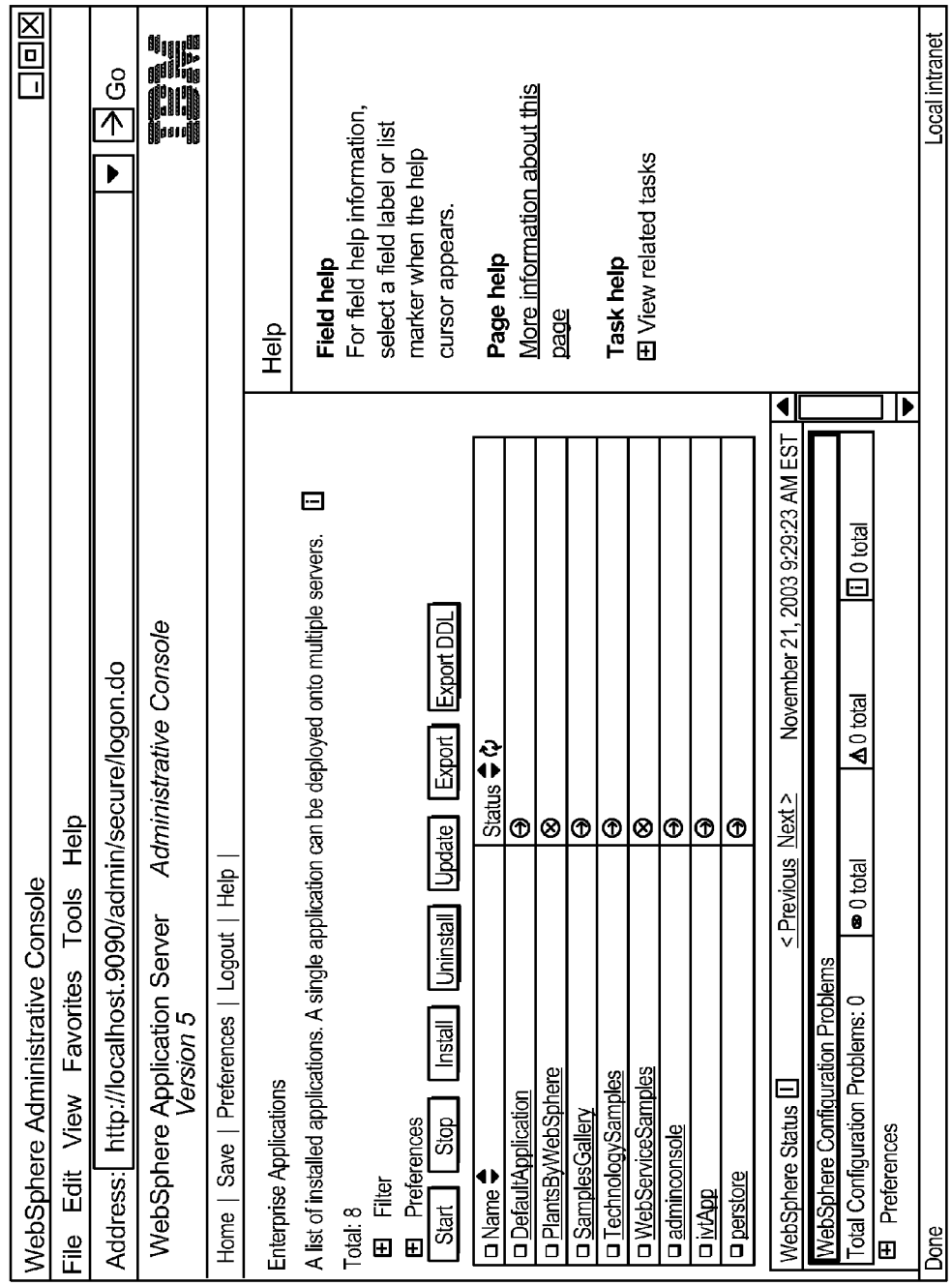
FIG. 4C illustrates the exemplary screen shot of FIG. 4A having status text displayed in accordance with a preferred embodiment of the present invention.

A JMX query is generated for each component (step 534). A response is received to each query (step 534), and the response is processed and transmitted to the browser (step 538). The response is received by the browser (step 540), and is then parsed to extract attribute value (step 542). The HTML page DOM is parsed and attribute value is assigned to the appropriate element's attribute (step 544), and the browser automatically displays the retrieved text content as tooltip text (step 546), after which the method ends as indicated by arrow 547. FIG. 4C illustrates the exemplary screen shot of FIG. 4A having status text displayed thereon in accordance with a preferred embodiment of the present invention.

In particular, when a request for additional information concerning a component is made by a user, a function is called at onFocus or onMouseover that performs an xmlHTTP Request to a status servlet that retrieves the text description of the status. Upon receiving the text response, the function sets the ALT/TITLE text to the received value.

If the request for additional information made in step 528 is unsuccessful, the default ALT/TITLE text remains and the method ends following step 526 as shown by arrow 548. In this circumstance, the user can use existing mechanisms to show text information, e.g., "click" on the status image to request text describing the object status in a new window, or use dynamic HTML to show a "legend" table that maps images to text status.

The present invention thus provides a system, method and computer program product for monitoring the status of components in a data processing system that improves the accessibility of JMX monitoring information in web content. The system includes a mechanism for acquiring a text representation of component status for display as ALT and TITLE content associated with an image of the status of the component. Because the component status is displayed in a manner that is indistinguishable from ALT/TITLE text that has already been statically included in an image attribute, user experience is improved for users with and without accessibility needs.

It is important to note that while the present invention has been described in the context of a fully functioning data processing system, those of ordinary skill in the art will appreciate that the processes of the present invention are capable of being distributed in the form of a computer readable storage medium of instructions. Examples of computer readable storage media include recordable-type media, such as a floppy disk, a hard disk drive, a RAM, CD-ROMs, DVD-ROMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for monitoring the status of a plurality of components in a data processing system, comprising: a web page executed by a processor of a computer, that was requested by a user that includes a status for said plurality of components; a panel servlet stored in memory and executed by a processor of a computer, the panel servlet being called responsive to said request; said panel servlet dynamically generating an HTML file that will be used to display said status for said plurality of components; a plurality of status servlets, each one of said plurality of said status servlets stored in memory and executed by a processor of a computer, each of the status servlets being associated with one of said plurality of components;

a plurality of status servlets, each one of said plurality of said status servlets executing in memory by a processor of a computer, each of the status servlets being associated with one of said plurality of components;

for each one of said plurality of components:

said panel servlet including an image tag for one of said plurality of components, said image tag pointing to one of said plurality of status servlets that is associated with said one of said plurality of components;

said image tag for said one of said plurality of components including information that is needed in order to perform a Java Management Extensions (JMX) query of said one of said plurality of components;

a status request that is placed in said one of said plurality of status servlets;

said one of said plurality of status servlets using information that is included in said status request to generate said JMX query of said one of said plurality of components;

said one of said plurality of status servlets receiving a status value for said one of said plurality of components in response to said JMX query;

said one of said plurality of status servlets sending, to said web browser, a displayable status image that corresponds to said status value for said one of said plurality of components;

said web browser displaying said displayable status image;

means for detecting a movement of a mouse over a particular displayable status image for a particular one of said plurality of components, said movement requesting additional information about a status of said particular one of said plurality of components;

ALT/TITLE text in said particular displayable status image statically set to default ALT/TITLE text;

a particular one of said plurality of status servlets that is associated with said particular one of said plurality of components attempting to retrieve a textual description of additional information about said status of said particular one of said plurality of components;

responsive to said attempt to retrieve being successful, said ALT/TITLE text set to said textual description; and responsive to said attempt to retrieve being unsuccessful, said ALT/TITLE text remaining set to said default ALT/TITLE.

2. A computer program product that is stored in a computer readable storage medium for monitoring the status of a plurality of components in a data processing system comprising:

instructions for requesting, by a user, a web page that includes a status for said plurality of components;

instructions responsive to said request, for calling a panel servlet;

instructions for dynamically generating, by said panel servlet, an HTML file that will be used to display said status for said plurality of components;

instructions for including a plurality of status servlets, each one of said plurality of said status servlets associated with one of said plurality of components;

for each one of said plurality of components: instructions for including, in said panel servlet, an image tag for one of said plurality of components, said image tag pointing to one of said plurality of status servlets that is associated with said one of said plurality of components;

instructions for including, in said image tag for said one of said plurality of components, information that is needed in order to perform a Java Management Extensions (JMX) query of said one of said plurality of components;

instructions for placing a status request in said one of said plurality of status servlets;

instructions for using, by said one of said plurality of status servlets, information that is included in said status request to generate said JMX query of said one of said plurality of components;

instructions for receiving, by said one of said plurality of status servlets, a status value for said one of said plurality of components in response to said JMX query;

instructions for sending, by said one of said plurality of status servlets to said web browser, a displayable status image that corresponds to said status value for said one of said plurality of components;

instructions for displaying, by said web browser, said displayable status image;

instructions for detecting a movement of a mouse over a particular displayable status image for a particular one of said plurality of components, said movement requesting additional information about a status of said particular one of said plurality of components;

ALT/TITLE text in said particular displayable status image statically set to default ALT/TITLE text;

instructions for attempting to retrieve, by a particular one of said plurality of status servlets that is associated with said particular one of said plurality of components, a textual description of additional information about said status of said particular one of said plurality of components;

instructions responsive to said attempt to retrieve being successful, for setting said ALT/TITLE text to said textual description; and responsive to said attempt to retrieve being unsuccessful, said ALT/TITLE text remaining set to said default ALT/TITLE.

* * * * *